US011140447B2

(12) United States Patent
Brehm et al.

(10) Patent No.: US 11,140,447 B2
(45) Date of Patent: Oct. 5, 2021

(54) PERSONALIZED MEDIA GUIDE FOR OFFLINE MEDIA DEVICES

(71) Applicant: Rovi Guides, Inc., San Jose, CA (US)

(72) Inventors: Michael James Brehm, Allen, TX (US); Benjamin Harden, Coronado, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/399,753

(22) Filed: Apr. 30, 2019

(65) Prior Publication Data

US 2020/0351555 A1 Nov. 5, 2020

(51) Int. Cl.
*H04N 21/462* (2011.01)
*H04N 21/422* (2011.01)
*H04N 21/458* (2011.01)
*H04N 21/45* (2011.01)
*H04N 21/442* (2011.01)

(52) U.S. Cl.
CPC ..... *H04N 21/462* (2013.01); *H04N 21/42209* (2013.01); *H04N 21/44213* (2013.01); *H04N 21/458* (2013.01); *H04N 21/4532* (2013.01)

(58) Field of Classification Search
CPC .......... H04N 21/462; H04N 21/42209; H04N 21/458; H04N 21/44213; H04N 21/4821; H04N 5/4403; H04N 21/4532; H04N 5/44543; H04N 21/482; H04N 21/26283; H04N 21/4181; H04N 21/6125; H04N 21/4332
USPC ........................................................ 725/39
See application file for complete search history.

(56) References Cited

U.S. PATENT DOCUMENTS

| | | | | |
|---|---|---|---|---|
| 7,370,343 B1* | 5/2008 | Ellis | ................ | H04N 21/47202 |
| | | | | 725/58 |
| 2002/0194601 A1* | 12/2002 | Perkes | ................ | G06F 16/9535 |
| | | | | 725/44 |
| 2005/0015713 A1* | 1/2005 | Plastina | ................. | G06F 16/48 |
| | | | | 715/231 |
| 2008/0141304 A1* | 6/2008 | Otsu | ................. | H04N 21/4586 |
| | | | | 725/40 |
| 2008/0168066 A1* | 7/2008 | Ruiz-Velasco | ......... | H04N 5/775 |
| (Continued) | | | | |

OTHER PUBLICATIONS

D. Grbić, M. Vranješ, B. Kovačević and M. Milošević, "Hybrid electronic program guide application for digital TV receiver," 2017 IEEE 7th International Conference on Consumer Electronics—Berlin (ICCE-Berlin), Berlin, 2017, pp. 177-180, doi: 10.1109/ICCE-Berlin.2017.8210622. (Year: 2017).*

*Primary Examiner* — Cynthia M Fogg
(74) *Attorney, Agent, or Firm* — Haley Guiliano LLP

(57) ABSTRACT

Systems and methods are described for displaying a guide for media content available on a user device. An illustrative method includes retrieving media content guide data for a plurality of channels, identifying a first media content item that is not available for retrieval from a content source, in response to identifying the first media content item, identifying a second media content item that is related to the first media content item and is available for retrieval from the content source, retrieving, from the content source, the second media content item, and generating for display a media content guide interface for the plurality of channels, wherein an identifier of the second media content item is displayed in a timeslot for the first media content item.

20 Claims, 7 Drawing Sheets

(56) References Cited

U.S. PATENT DOCUMENTS

| | | | | |
|---|---|---|---|---|
| 2011/0301963 | A1* | 12/2011 | Diab | G06Q 30/0215 |
| | | | | 705/1.1 |
| 2015/0237389 | A1* | 8/2015 | Grout | H04N 21/4788 |
| | | | | 725/49 |
| 2016/0150259 | A1* | 5/2016 | Sokolov | H04N 21/25435 |
| | | | | 725/1 |
| 2016/0165307 | A1* | 6/2016 | Lavender | H04N 21/4627 |
| | | | | 725/29 |
| 2017/0118064 | A1* | 4/2017 | Medina | H04L 41/0654 |
| 2017/0201571 | A1* | 7/2017 | Sherf | H04L 43/0817 |
| 2018/0227638 | A1* | 8/2018 | Jain | H04N 21/84 |
| 2019/0132630 | A1* | 5/2019 | Loheide | H04N 21/26258 |

\* cited by examiner

PERSONALIZED MEDIA GUIDE FOR OFFLINE MEDIA DEVICES

BACKGROUND

The present disclosure relates to personalized media guides, and more particularly, to methods and systems for generating a personalized media guide for offline media devices.

SUMMARY

Media devices, such as smartphones, tablets, computers, etc., have become very popular for watching media content, and for some users, may even be the primary device on which they watch media content. Users have also become accustomed to having their media devices with them at all times and want their media devices to operate in the same manner regardless of where they are used. Advances in network technologies, such as high-speed wireless and cellular networks, have greatly reduced the amount of time that media devices are not connected to content distribution networks, but there are still some instances and situations where the media devices are offline.

While many users now prefer to watch media content on demand, or time shifted, a lot of media content items are still first distributed via linear content distribution channels. As a result, many users are still accustomed to viewing a channel-based media guide, such as an electronic program guide (EPG), to find media content to watch. Some examples of EPGs provide a list of channels available to the user along with a plurality of timeslots for each channel identifying the media content that will be distributed during those timeslots. While such EPGs are well suited for media devices that are connected to the content distribution network via a high-bandwidth (e.g., broadband) connection, these EPGs do not operate as well when the media devices are offline (e.g., disconnected or have a slow, low-bandwidth, or limited connection to the content distribution network), and are thus unable to receive the linear content distributions.

To overcome such problems, methods and systems are described herein for generating media guides for offline media devices. In particular, the embodiments described herein provide for retrieving media content guide data and media content available for retrieval in advance—e.g., while the media devices are connected to the content distribution network via a high-bandwidth connection. A media guide for the retrieved content is then generated for display when the media devices are offline.

In some embodiments, media content guide data are retrieved for a subset of channels preferred by a user. The methods and systems then identify one or more media content items, from the media content guide data for the channels preferred by the user, that are not available for retrieval in advance. To substitute for such media content items, the methods and systems then identify other media content items that are related to the unavailable media content items and that are available for retrieval in advance and retrieve those other media content items. A media content guide interface is then generated for the subset of channels preferred by the user, and identifiers for the other media content items are displayed in timeslots for the unavailable media content items. The media content guide is thus personalized for the user and includes only content that is available for offline viewing on the media device.

The methods and systems described herein thus improve the user experience for offline media devices by displaying only content that is available for viewing and excluding any content that is not available. The methods and systems further provide for improved resource allocation due to retrieving only media content for channels preferred by the user, thereby reducing wasted network traffic and storage allocation for media content items the user will not want to watch.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
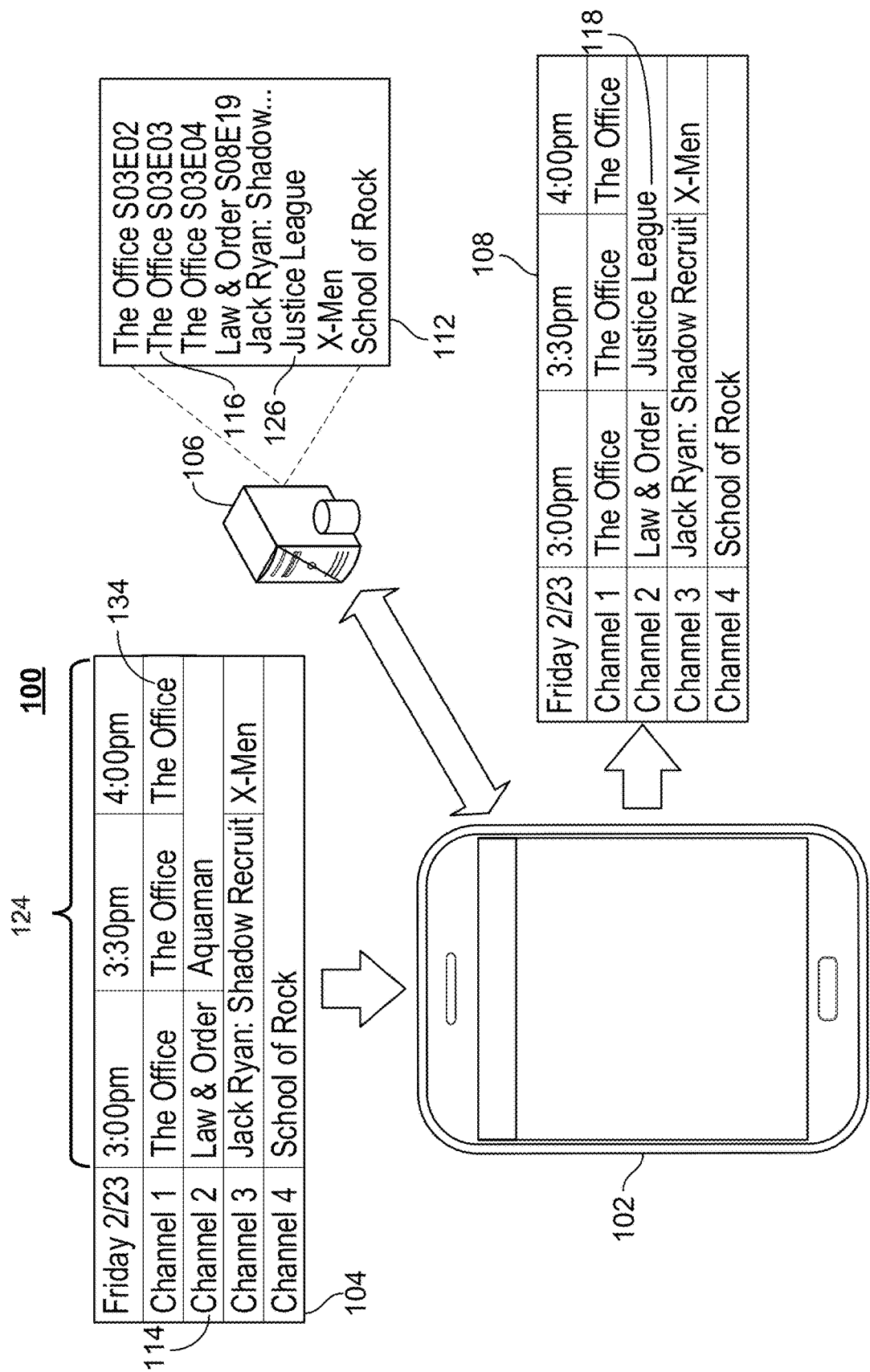
FIG. 1 shows an illustrative scenario for generating a personalized media guide for offline media devices, in accordance with some embodiments of the disclosure.

FIG. 1 shows an illustrative scenario 100 for generating a personalized media guide for offline media devices. In FIG. 1, a media device 102 receives as input media content guide data 104. The media content guide data 104 includes a plurality of identifiers for channels 114 and a plurality of timeslots 124, each including a media content identifier 134 corresponding to a media content item that will be distributed during that timeslot 124. The media device 102 then retrieves one or more media content items 116 corresponding to the media content identifiers 134 from a database 112 provided by a content source 106. If a first media content item corresponding to one of the media content identifiers 134 is not available for retrieval from the content source 106, the media device 102 identifies a second media content item 126 that is related to the first media content item that is not available for retrieval and retrieves the second media content item 126. The media device 102 then generates for display a personalized media content guide 108 in which a media content identifier 118 of the second media content item 126 is displayed in a timeslot of the first media content item.

The media device 102 may be any device on which media content guides can be displayed, such as a smartphone, a personal computer (PC), a laptop computer, a tablet computer, a handheld computer, a personal digital assistant (PDA), a smart television (TV), a streaming media device, a WebTV box, a personal computer television (PC/TV), a wearable computer, an automotive media system, and/or any other computing equipment on which media content guides can be displayed. As described further below, the media device 102 is configured to display a graphical user interface (GUI) that shows the personalized media content guide 108 and may further show the media content items 126.

The media content guide data 104 may be any data from which a media content guide may be generated. For example, the media content guide data 104 may include electronic program guide (EPG) data usable for generating conventional EPGs. In some embodiments, the media content guide data 104 includes linear content distribution data—that is, data indicating the media content items that will be distributed by a particular channel 114 at a particular time. In other embodiments, the media content guide data 104 includes on-demand or streaming content availability data indicating media content items that are available from a particular channel 114 at any time, not necessarily limited to a particular time. The channels 114 may thus be linear distribution channels (e.g., broadcast television and/or live streaming channels) and/or on-demand distribution channels (e.g., on demand retrieval and/or streaming channels).

The content source 106 may be any server or other computing device from which media content items 116 and 126, and/or metadata related to the media content items 116 and 126 may be retrieved. For example, the content source 106 may be a cloud storage platform by means of which media content items are collected, stored, and distributed, and from which a media device 102 may retrieve the media content items 116 and 126. The media content items 116 and 126 may be any audio and/or video content distributed by a content source 106 and retrievable by the media device 102. Examples of media content items 116 and 126 include television shows, web-TV shows, video shorts, movies, home videos, music and other audio recordings, etc.

Figure 2:
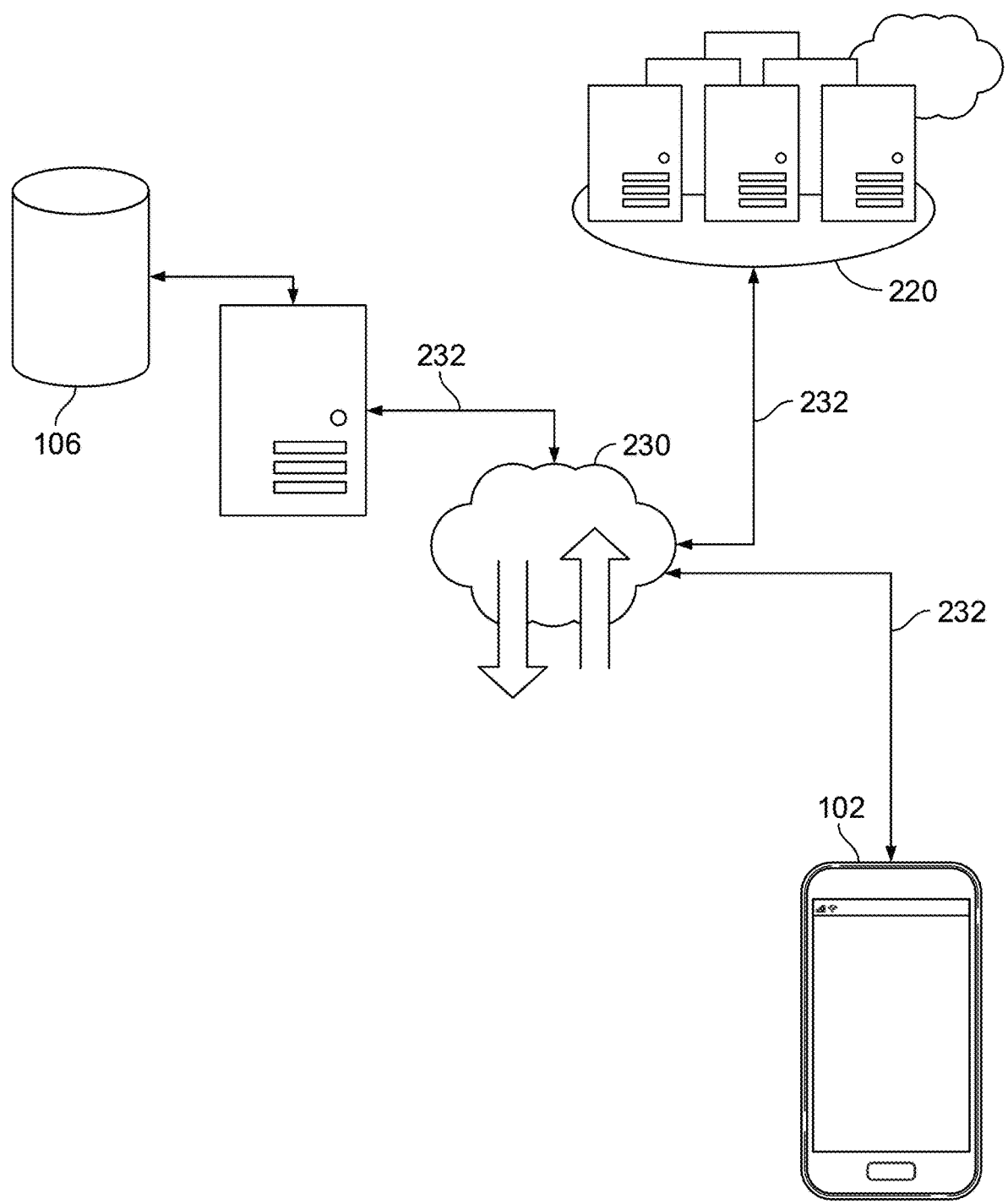
FIG. 2 shows an illustrative system for generating a personalized media guide for offline media devices, in accordance with some embodiments of the disclosure.

FIG. 2 shows an illustrative system for generating a personalized media guide for offline media devices. In particular, FIG. 2 shows a system 200 where the media device 102 retrieves the media content items 116 and 126, and/or the metadata related to the media content items 116 and 126 from the content source 106 via a communications path 232. The communications path 232 may be any network or communication equipment or medium by means of which the media device 102 can communicate with (e.g., submit a query to and/or retrieve data or content from) the content source 106. In one illustrative example, the communications path 232 includes devices connected via the Internet.

A media content guide-generating application may be implemented on any one or a combination of the media device 102, the content source 106, and/or an application server 220, each of which may function as a stand-alone device or may be part of a network of devices. Various network configurations of devices may be implemented and are discussed in more detail below. In the system 200, there may be multiple media devices 102, but only one is shown in FIG. 2 to avoid overcomplicating the drawing. In addition, multiple users may each utilize more than one type of media device 102 and also more than one of each type of media device 102, as described above.

The media device 102 may be coupled to a communication network 230. The communication network 230 may be one or more networks including the Internet, mobile phone network, mobile voice or data network (e.g., a 4G or LTE network), cable network, public switched telephone network, or other types of communication network or combinations of communication networks. The media device 102, the content source 106, and the application server 220 may be connected to the communication network 230 via one or more communications paths 232, such as a satellite path, a fiber-optic path, a cable path, a path that supports Internet communications (e.g., IP), free-space connections (e.g., for wireless signals), and/or any other suitable wired or wireless communications path or combination of such paths.

Although communications paths 232 are not drawn directly between the media device 102 and the content source 106 or the application server 220, these devices may communicate directly with each other via communications paths 232, such as short-range point-to-point communications paths, for example USB cables, IEEE 1394 cables, wireless paths (e.g., BLUETOOTH, infrared, IEEE 802-11x, etc.), or other short-range communication via wired or wireless paths. BLUETOOTH is a certification mark owned by Bluetooth SIG, INC. The devices may also communicate with each other directly through an indirect path via the communication network 230.

The system 200 may include more than one content source 106, but only one is shown in FIG. 2 to avoid overcomplicating the drawing. As shown in FIG. 1, the content source 106 includes a database, table, or other data structure, (referred to hereinafter as database 212) storing a list of each media content item 116 and 126 on the content source 106, and/or data indicating other media content items to which each media content item 116 and 126 is related.

The media content guide-generating application may be, for example, a stand-alone application implemented on the media device 102 described above. For example, the media content guide-generating application may be implemented as software or a set of executable instructions, which may be stored in storage 308 (described below with reference to FIG. 3) and executed by control circuitry 304 (described below with reference to FIG. 3) of the media device 102. In some embodiments, the media content guide-generating application is a client/server-based application where only a client application resides on the media device 102, and a server application resides on the application server 220. For example, a media content guide-generating application may be implemented partially as a client application on the control circuitry 304 of the media device 102 and partially on the application server 220 as a server application running on the control circuitry 304 of the application server 220. When executed by the control circuitry 304 of the application server 220, the media content guide-generating application may instruct the control circuitry 304 of the media device 102 to transmit the media content guide data and/or data regarding the second media content item 126 to the application server 220, which then generates the personalized media content guide 108 and transmits the personalized media content guide 108 back to the media device 102.

While system 200 is shown in FIG. 2 as including only the media device 102, the content source 106, and the application server 220, those skilled in the art will appreciate that the system 200 may further include various other devices. In some embodiments, the media device 102 may operate in a cloud computing environment to access cloud services. In a cloud computing environment, various types of computing services for content sharing, storage, or distribution are provided by a collection of network-accessible computing and storage resources, referred to as "the cloud." The media device 102 may be a cloud client that relies on cloud computing for application delivery, or the media device 102 may have some functionality without access to cloud resources. For example, some applications running on the media device 102, such as the media content guide-generating application, may be cloud applications, that is, applications delivered as a service over the Internet, while other applications may be stored and run on the media device 102. In some embodiments, the media device 102 uses cloud resources for processing operations, such as the processing operations performed by the processing circuitry 306 described in relation to FIG. 3. For example, the media device 102 may rely on the application server 220 and/or another cloud resource to generate the personalized media content guide 108.

Figure 3:
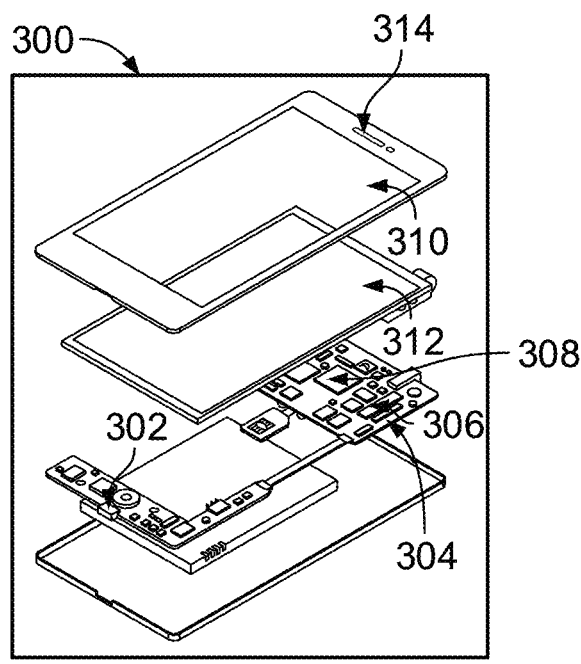
FIG. 3 shows a diagram of illustrative devices of the system of FIG. 2, in accordance with some embodiments of the disclosure.
Figure 3:
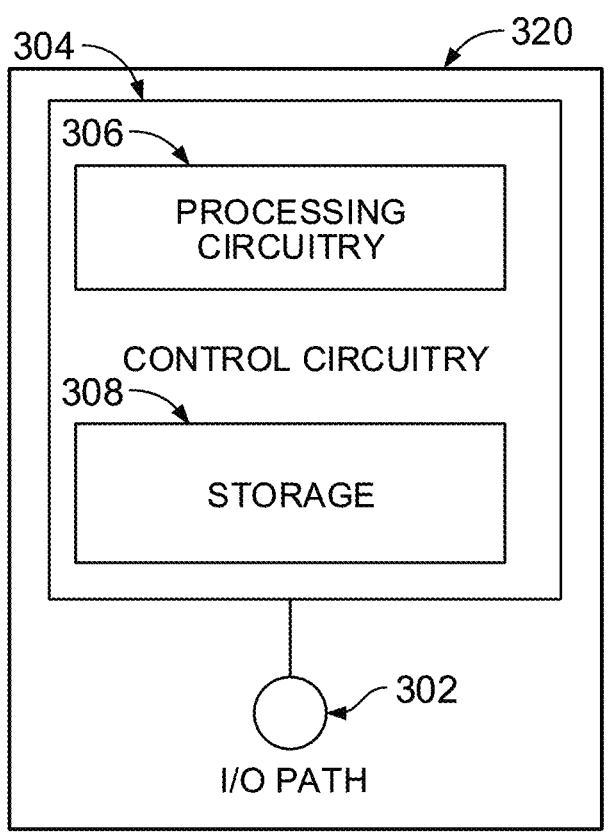

FIG. 3 shows a generalized embodiment of an illustrative media device 300. As depicted, the media device 300 may be a smartphone or tablet. The media device 300 may receive content and data via an input/output (hereinafter "I/O") path 302. The I/O path 302 may provide user input, user preferences, the media content guide data 104, the media content items 116 and 126, and/or metadata related to any of the aforementioned to control circuitry 304, which includes processing circuitry 306 and storage 308. The control circuitry 304 may send and receive commands, requests, and other suitable data using the I/O path 302. The I/O path 302 may connect the control circuitry 304 (and specifically the processing circuitry 306) to one or more communications paths (described below). I/O functions may be provided by one or more of these communications paths, but a single path is shown in FIG. 3 to avoid overcomplicating the drawing.

The control circuitry 304 may be based on any suitable processing circuitry, such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, the control circuitry 304 executes instructions for a media content guide-generating application stored in memory (i.e., the storage 308). Specifically, the control circuitry 304 may be instructed by the media content guide-generating application to identify the second media content item 126 that is related to the first media content item, generate the media content guide, and/or perform the other functions described above and below.

In client/server-based embodiments, the control circuitry 304 includes communications circuitry suitable for communicating with a media content guide-generating application server or other networks or servers. The instructions for carrying out the above-mentioned functionality may be stored on a server. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication networks or paths. In addition, the communications circuitry may include circuitry that enables peer-to-peer communication of media devices, or communication of media devices in locations remote from each other.

The memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, hard drives, optical drives, solid state devices, quantum storage devices, or any other suitable fixed or removable storage devices, and/or any combination of the same. Nonvolatile memory may also be used. Cloud-based storage, described in relation to FIG. 2, may be used to supplement the storage 308 or instead of the storage 308.

The circuitry described herein may execute instructions included in software running on one or more general purpose or specialized processors. Multiple circuits may be provided to handle simultaneous processing functions. If the storage 308 is provided as a separate device from the media device 300, the circuitry may be associated with the storage 308.

A user may send instructions to the control circuitry 304 using a user input interface 310 of the media device 300. The user input interface 310 may be any suitable user interface, such as a remote control, mouse, trackball, keypad, keyboard, touchscreen, touchpad, stylus input, joystick, or other user input interfaces. Display 312 may be a touchscreen or touch-sensitive display. In such circumstances, user input interface 310 may be integrated with or combined with the display 312. A camera, microphone, or other visual or voice recognition interface may also be used to receive user input. Speakers 314 may be provided as integrated with other elements of the media device 300.

The media content guide-generating application may be implemented using any suitable architecture. For example, it may be a stand-alone application wholly implemented on the media device 300. The media content guide-generating application and/or any instructions for performing any of the embodiments discussed herein may be encoded on computer-readable media. Computer-readable media include any media capable of having computer-executable instructions encoded thereon that, when executed by a processor, cause a device, such as media device 300, to perform the instructed operations. In some embodiments, the media content guide-generating application is a client/server-based application. Data for use by a thick or thin client implemented on the media device 300 are retrieved on demand by issuing requests to a server remote from the media device 300, as described above. Those skilled in the art will appreciate that the media device 102 of FIG. 1 may be implemented as the media device 300 of FIG. 3.

Figure 4A:
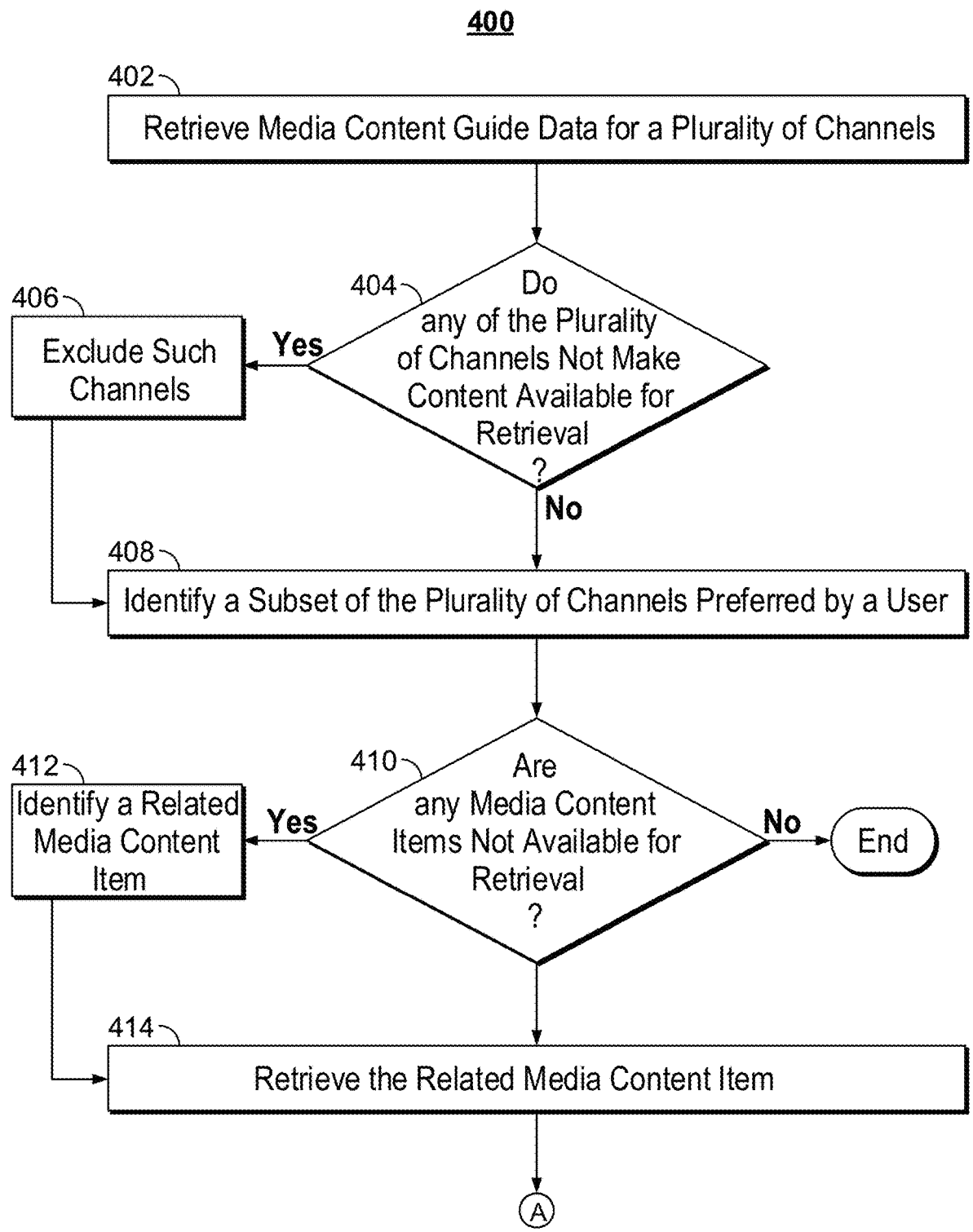
FIGS. 4A and B show a flowchart of an illustrative process for generating a personalized media guide for offline media devices, in accordance with some embodiments of the disclosure.
Figure 4B:
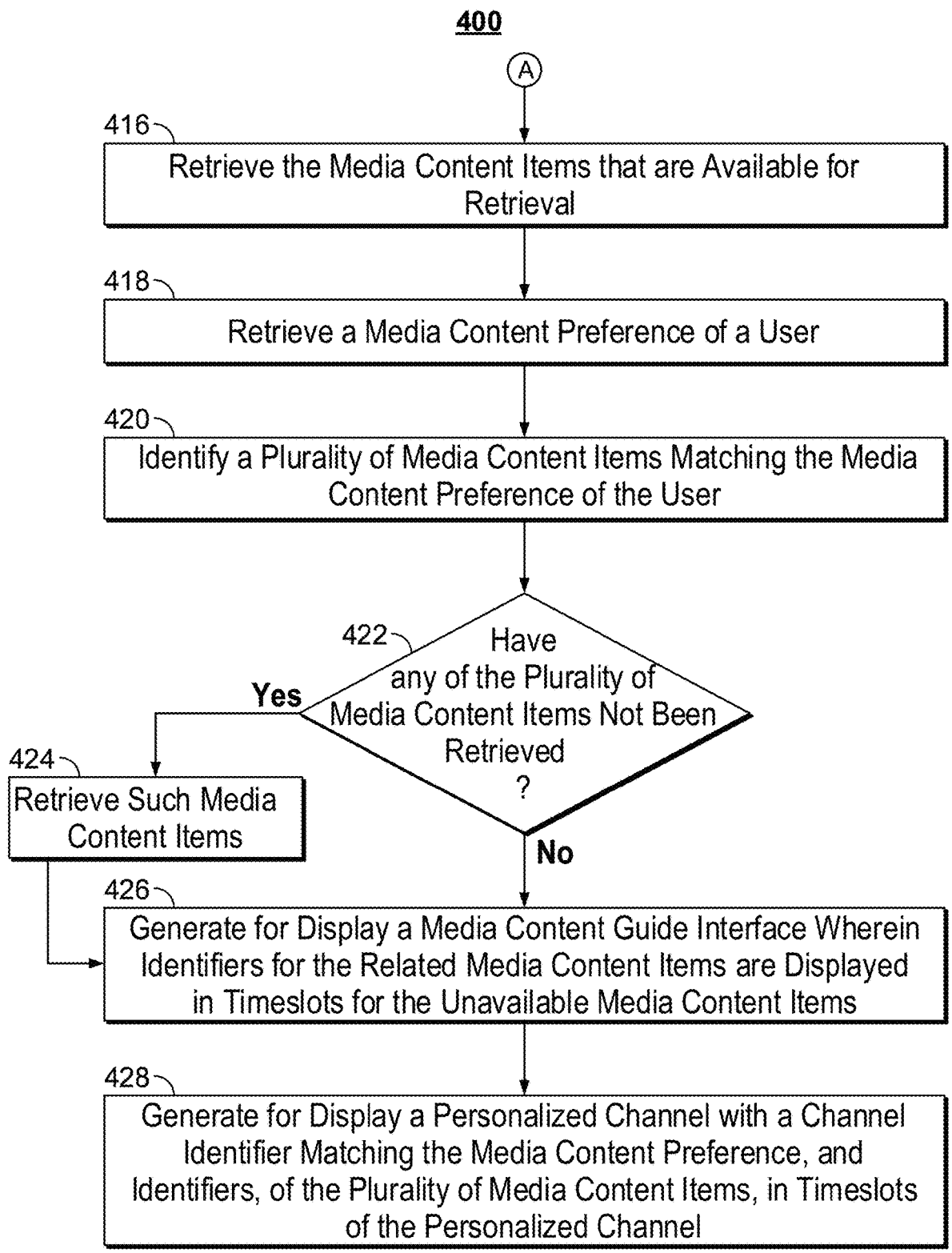

FIG. 4 is a flowchart of an illustrative process for generating a personalized media guide for offline media devices, in accordance with some embodiments of the disclosure. A process 400 for generating a personalized media guide for offline media devices may begin at block 402, where control circuitry, such as the control circuitry 304, retrieves media content guide data, such as the media content guide data 104, for a plurality of channels 114. For example, the control circuitry 304 of the media device 102 may retrieve the media content guide data 104 from a content source, such as the content source 106, or another provider of media content guide data. In some embodiments, the media content guide data indicates, for each of the plurality of channels 114, the media content items 116 that will be distributed by each respective channel 114 during a plurality of timeslots 124. In some embodiments, the media content guide data 104 includes data for multiple days or even weeks, but the control circuitry 304 retrieves media content guide data for merely a subset of that period, for example, only one or two days.

At block 404, the control circuitry 304 determines whether any of the plurality of channels 114 do not make media content items 116 distributed by such channels available for retrieval. For example, some channels 114 may make media content items 116 distributed by such channels available only via linear distribution (e.g., live distribution during a predetermined time). Other channels 114 may also make media content items 116 distributed by such channels available via streaming. Both of these example channels 114, however, do not make the media content items 116 they distribute available for retrieval. In response to determining that one or more of the plurality of channels 114 do not make media content items 116 distributed by such channels available for retrieval, the process 400 proceeds to block 406. In response to determining that none of the plurality of channels 114 do not, and thus all of the plurality of channels do, make the media content items 116 distributed by the channels 114 available for retrieval, the process skips ahead to block 408.

At block 406, the control circuitry 304 excludes the channels 114 determined at block 404 to not make media content items 116 available for retrieval from the plurality of channels 114. For example, the control circuitry 304 may generate a list of the channels 114 included in the plurality of channels 114 for which media content guide data 104 was retrieved at block 402 and may remove from the list any channels 114 determined at block 404 to not make media content items 116 available for retrieval.

At block 408, the control circuitry 304 identifies a subset of the plurality of channels 114 that are preferred by a user. For example, the control circuitry 304 may retrieve, from a user profile of the user, a viewing history indicating a group of channels 114 that are viewed regularly by the user. In some embodiments, the control circuitry 304 may determine that a channel that is viewed at least once every seven days is a channel that the user views regularly. In other embodiments, the control circuitry 304 may determine that a channel that is viewed at least three times every seven days is a channel that the user views regularly. Those skilled in the art will appreciate that these examples of regularity are merely illustrative, and that other intervals or thresholds may be substituted for these examples without departing from the scope of the present disclosure. The control circuitry 304 may then select, from the group of channels 114 that are viewed regularly by the user, those channels 114 that make media content 134 available for retrieval as the subset of the plurality of channels 114 that are preferred by the user.

At block 410, the control circuitry 304 determines whether any media content items 116 that will be distributed by the plurality of channels 114 in the subset are not available for retrieval. For example, the control circuitry 304 may determine whether a first media content item 116, that is indicated in the media content guide data 104 as scheduled for distribution by one of the channels 114 in the subset identified at block 408, is not available for retrieval from the content source 106. In response to determining that none of the media content items 116 that will be distributed by the plurality of channels 114 in the subset are not available, and thus all of the media content items 116 are available, for retrieval, the process 400 ends. In response to determining that the first media content item 116 is not available for retrieval, the process 400 proceeds to block 412.

At block 412, the control circuitry 304 identifies a second media content item 126 that is related to the first media content item and is available for retrieval. For example, the control circuitry 304 may identify a second media content item 126 that has the same genre, plot, director, starring cast member, and/or is from the same series of media content items as the first media content item. The process for identifying the second media content item 126 is further described below with reference to FIGS. 5 and 6.

At block 414, the control circuitry 304 retrieves the second media content item 126 identified at block 412. For example, the control circuitry 304 may download the second media content item 126 from the content source 106, store a stream of the second media content item 126 received from the content source 106, and/or load a previously downloaded or stored copy of the media content item 126 from the memory 308. In other words, in some embodiments, the second media content item 126 has previously been retrieved from the content source 106 and is thus already stored in the memory 308. In such embodiments, the control circuitry 304 determines whether the second media content item 126 is stored in the memory 308, and in response to determining that the second media content item 126 is stored in the memory 308, the control circuitry 304 does not again retrieve the second media content item 126 from the content source 106.

At block 416, the control circuitry 304 retrieves a plurality of media content items 116 that will be distributed by the channels 114 in the subset. For example, the control circuitry 304 may identify, from the plurality of media content items 116 that the media content guide data 104 indicates will be distributed by the channels 114 in the subset of the plurality of channels 114 preferred by the user, such media content items 116 that are available for retrieval from the content source 106, and send a request to the content source 106 to retrieve such media content items 116 from the database 112. In some embodiments, the control circuitry 304 may first determine which of the plurality of media content items 116 that will be distributed by the channels 114 in the subset are currently stored on the media device 102 (e.g., in the storage 308), and exclude such media content items 116 when determining which media content items 116 to retrieve since those media content items 116 are already stored on the media device 102.

At block 418, the control circuitry 304 retrieves a media content preference of the user. For example, the control circuitry 304 may retrieve, from the user profile of the user, a media content preference of the user—e.g., a particular genre, character, starring cast member, media content series or franchise, director or other production member, etc.

At block 420, the control circuitry 304 identifies a plurality of media content items 116 matching the media content preference of the user, as retrieved at block 418. For example, the control circuitry 304 may retrieve metadata associated with the media content items 116 and parse the metadata to determine if the metadata describe the media content preference of the user.

At block 422, the control circuitry 304 determines whether any of the plurality of media content items 116 that were determined to match the media content preference of the user at block 420 are not stored on the media device 102, and thus need to be retrieved. In some embodiments, the control circuitry 304 selects a subset of the plurality of media content items 116 matching the media content preference of the user for inclusion in a personalized channel and determines whether the selected subset of media content items 116 are currently stored on the media device 102. In response to determining that one or more of the media content items 116 in the plurality of media content items 116 are not currently stored on the media device 102, the process 400 proceeds to block 424. In response to determining that all of the media content items 116 in the plurality of media content items 116 are already stored on the media device 102, the process 400 skips ahead to block 426.

At block 424, the control circuitry 304 retrieves the media content items 116 identified at block 422 as not currently being stored on the media device 102. For example, the control circuitry 304 may download the media content items 116 identified at block 422 from the content source 106, store a stream of the media content items 116 identified at block 422 received from the content source 106, and/or load previously downloaded or stored copies of the media content items 116 identified at block 422 from the memory 308. Thus, similar to the retrieval of the second media content item 126 described above with reference to block 414, in some embodiments, the media content items 116 identified at block 422 were previously retrieved from the content source 106 and are thus already stored in the memory 308. In such embodiments, the control circuitry 304 determines whether the media content items 116 identified at block 422 are stored in the memory 308, and in response to determining that the media content items 116 identified at block 422 are stored in the memory 308, the control circuitry 304 does not again retrieve the media content items 116 identified at block 422 from the content source 106.

At block 426, the control circuitry 304 generates for display a media content guide interface 108 in which a media content identifier 118 for the second media content item 126, as identified at block 412, is displayed in a timeslot 124 for the first media content item 116 that was determined to be unavailable for retrieval at block 410. The media content guide interface 108 may include identifiers for media content items that were retrieved from the content source 106 at blocks 416 and 424, as well as identifiers for media content items that were previously retrieved and thus already stored in the memory 308. In some embodiments, the control circuitry 304 replaces an identifier for the first media content item 116 with the identifier 118 for the second media content item 126 and generates for display only the identifier 118 for the second media content item 126 in the timeslot of the first media content item 116. In other embodiments, the control circuitry 304 generates for display both the identifier for the first media content item 116 and the identifier 118 for the second media content item 126 in the timeslot for the first media content item 116. In such embodiments, the control circuitry 304 may generate for display the identifier for the first media content item 116 in such a manner that indicates that the first media content item 116 has been replaced by the second media content item 126. For example, the identifier for the first media content item may be greyed-out, dimmed, struck through, highlighted in a different color, etc. The control circuitry 304 may further generate for display an indication that the second media content item 126 is provided in place of the first media content item 116. For example, the control circuitry 304 may generate for display a visual indicator or mark indicating that the second media content item 126 is replacing the first media content item 116. The control circuitry 304 may further generate for display identifiers for media content items 116 that are available for retrieval in timeslots corresponding to those media content items 116. In some embodiments, the control circuitry 304 may generate for display the media content guide interface 108 at a time when the media device 108 is not connected to the content source 106, and thus not able to receive live distributions or streaming of the media content items 116. For example, the control circuitry 304 may determine whether the media device 102 has a high-bandwidth connection to the content source 106, and if the media device 102 does not, generate for display the media content guide interface 108.

At block 428, the control circuitry 304 generates for display a personalized channel with a channel identifier matching the media content preference of the user, and identifiers of the plurality of media content items 116 matching the user preference, as identified at block 420, in timeslots of the personalized channel. For example, the control circuitry 304 may generate for display a personalized channel of media content items 116 matching the user preference. The channel identifier for the personalized channel may correspond to the media content preference (e.g., a particular media content series or franchise, character, etc.) and the control circuitry 304 may fill the timeslots for the personalized channel with identifiers for the media content items 116 preferred by the user, as identified at block 420.

Figure 5:
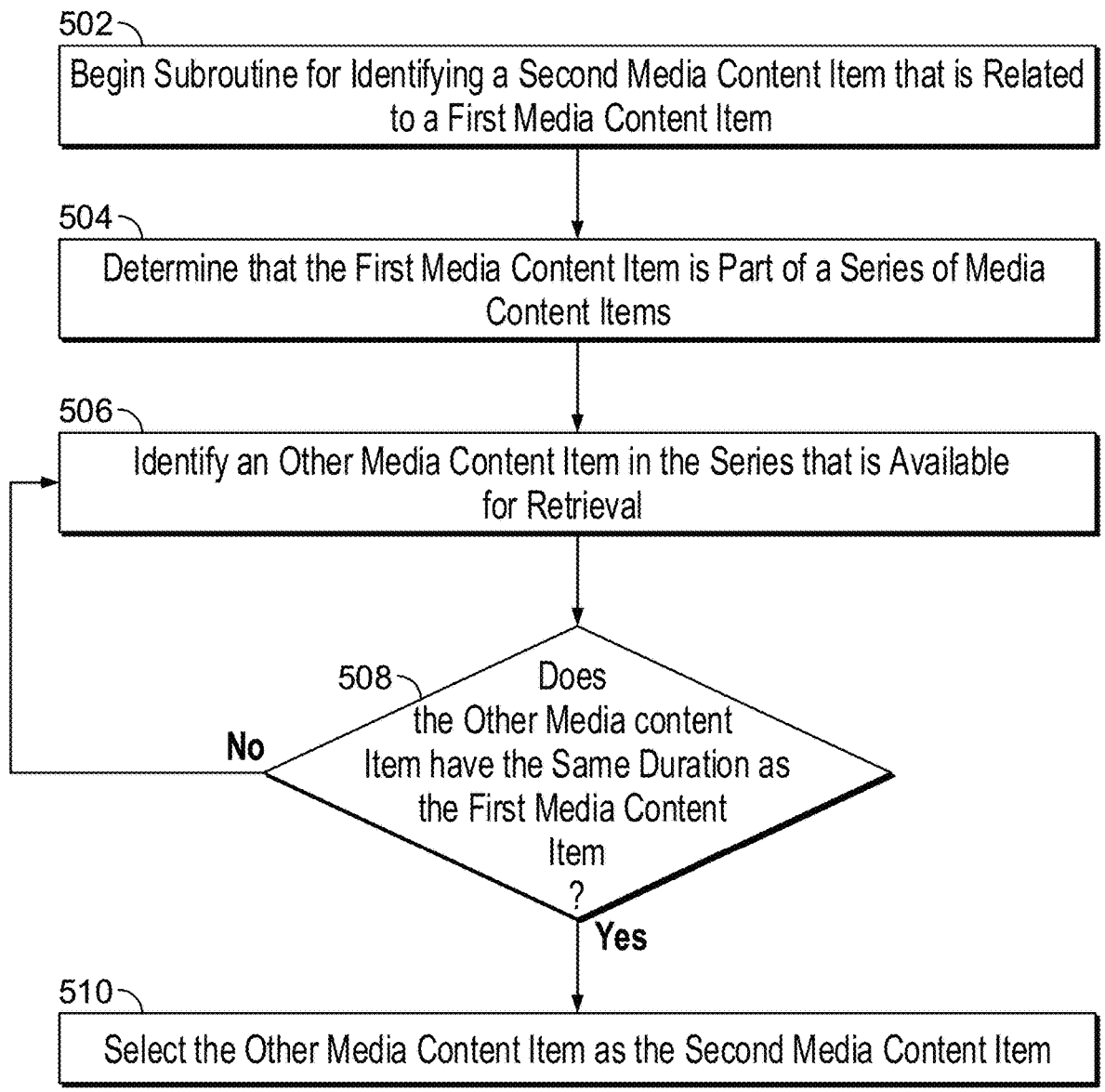
FIG. 5 is a flowchart of a detailed illustrative process for identifying a second media content item that is related to a first media content item, in accordance with some embodiments of the disclosure.

FIG. 5 is a flowchart of a detailed illustrative process for identifying a second media content item that is related to a first media content item, in accordance with some embodiments of the disclosure. A process 500 for identifying a second media content item that is related to a first media content item may begin at block 502. At block 504, the control circuitry 304 determines that the first media content item is part of a media content series or franchise. For example, the control circuitry 304 may retrieve metadata associated with the first media content item and determine, based on the metadata, that the first media content item is part of the media content series or franchise.

At block 506, the control circuitry 304 identifies an other media content item in the media content series or franchise that is available for retrieval. For example, the control circuitry 304 may query the database 112 for media content items 126 that are part of the media content series or franchise identified at block 504.

At block 508, the control circuitry 304 determines whether the other media content item identified at block 506 has the same duration as the first media content item 116. For example, the control circuitry 304 may compare the duration of the first media content item 116 with the duration of the other media content item identified at block 506. In response to determining that the duration of the first media content item 116 and the other media content item identified at block 506 are not the same, the process 500 returns to block 506 where the control circuitry 304 identifies another media content item in the media content series or franchise. In response to determining that the first media content item 116 and the other media content item identified at block 506 have the same duration, the process 500 proceeds to block 510. In some embodiments, the control circuitry 304 selects multiple other media content items to replace the first media content item 116. For example, if the first media content item 116 has a duration that is longer than the other media content items identified at block 506, the control circuitry 304 may select multiple other media content items to fill the duration of the first media content item 116. In such embodiments, the control circuitry 304 may use various algorithms to select the other media content items to fill the duration of the first media content item 116. An example of such algorithms is the 0-1 knapsack algorithm, which is an optimization solution that maximizes the value of a collection of assets drawn from a larger set, where each asset has a "weight" and "value," and each asset must be taken in whole (as opposed to the fractional-knapsack algorithm where you can select a portion of an asset if needed). The collection of selected assets must fit into a given size container. This algorithm draws from a set of solutions that display an optimal substructure, where the solution for a knapsack of size W draws from an optimal solution for W−$w_i$, and can thus be solved by dynamic programming. Specifically, to consider an item for inclusion, the algorithm must compare the solution to the subproblem where the item is included versus the subproblem where the item is excluded before determining if the item should be included in the optimal solution.

To map the 0-1 knapsack algorithm to the problem of selecting other media content items to fill the duration of the first media content item 116, each item for consideration is simply a media content item stored in the storage 308 of the media device 102 that matches any predefined content restriction rules (e.g., must be part of the same media content series or franchise). Since the size of the knapsack, W, would be the duration of the first media content item 116, the "weight" of each item, $w_i$, would be its duration. The "value" of the item, $v_i$, would be a relevancy score of the other media content item to the first media content item 116. For example, an other media content item that is the immediately preceding or subsequent installment in the media content series or franchise will have a higher relevancy score than other media content items that are further removed in the media content series or franchise from the first media content item 116. Thus, the 0-1 knapsack will attempt to find the maximum $\Sigma v_i$ such that their corresponding $\Sigma w_i \leq W$.

In some embodiments, the top-scoring/highest-valued other media content item has a duration that is shorter than the duration of the first media content item 116, and thus the algorithm will attempt to fill the remainder of the duration of the first media content item 116 with a second other media content item. Thus, in some embodiments, the control circuitry 304 may fill the duration of the first media content item 116 with multiple other media content items that have a higher relevancy score, and that together fill the duration of the first media content item 116.

At block 510, the control circuitry 304 selects the other media content item identified at block 506 as the second media content item 126.

Figure 6:
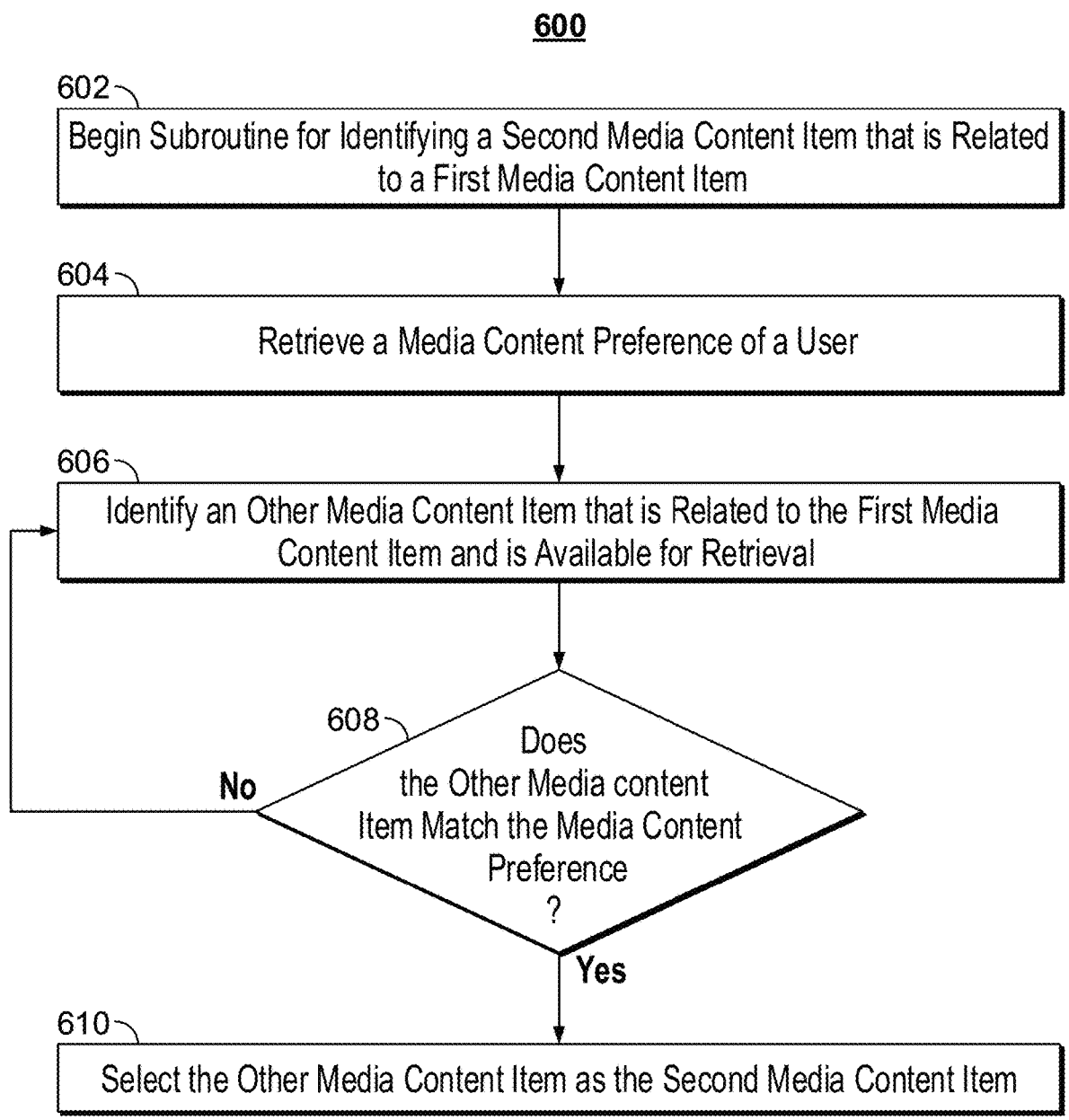
FIG. 6 is a flowchart of another detailed illustrative process for identifying a second media content item that is related to a first media content item, in accordance with some embodiments of the disclosure.

FIG. 6 is a flowchart of another detailed illustrative process for identifying a second media content item 126 that is related to a first media content item 116, in accordance with some embodiments of the disclosure. A process 600 for identifying a second media content item 126 that is related to a first media content item 116 may begin at block 602. At block 604, the control circuitry 304 retrieves a media content preference of the user. For example, the control circuitry 304 may retrieve, from the user profile of the user, a media content preference of the user—e.g., a particular genre, character, starring cast member, media content series or franchise, director or other production member, etc.

At block 606, the control circuitry 304 identifies an other media content item that is related to the first media content item 116 and is available for retrieval. For example, the control circuitry 304 may identify an other that has the same genre, plot, director, starring cast member, and/or is from the same series of media content items as the first media content item, and query the database 112 to determine if the other media content item is available for retrieval.

At block 608, the control circuitry 304 determines whether the other media content item identified at block 606 matches the media content preference of the user retrieved at block 604. For example, the control circuitry 304 may retrieve metadata of the other content item identified at block 606 and parse the metadata to determine if the metadata describes the media content preference of the user. In response to determining that the other media content item identified at block 606 does not match the media content preference of the user, the process 600 returns to block 606 where the control circuitry 304 selects another media content item that is related to the first media content item 116 and is available for retrieval. In response to determining that the other media content item identified at block 606 matches the media content preference of the user, the process 600 proceeds to block 610.

At block 610, the control circuitry 304 selects the other media content item identified at block 606 as the second media content item 126.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for displaying a guide for media content available on a user device, the method comprising:
    retrieving media content guide data for a plurality of channels, wherein the media content guide data indicates, for each of the plurality of channels, media content items that will be distributed by each respective channel during a plurality of timeslots;
    identifying, from among the media content items that will be distributed by the plurality of channels, a first media content item that has a respective timeslot of the plurality of timeslots and that is not available for retrieval from a content source for offline viewing in advance of the respective timeslot;
    in response to identifying the first media content item, identifying a second media content item that is related to the first media content item and is available for retrieval from the content source for offline viewing;
    retrieving, from the content source, the second media content item; and
    generating for display a media content guide interface that includes identifiers for media content items that are available for offline viewing and excludes identifiers for media content items that are unavailable for offline viewing for the plurality of channels at a time when the user device is not connected to the content source, wherein an identifier of the second media content item which has been retrieved from the content source is displayed in a timeslot for the first media content item.

2. The method of claim 1, further comprising:
retrieving, from the content source, a third media content item of the media content items that will be distributed by the plurality of channels,
wherein generating for display the media content guide interface for the plurality of channels further comprises generating for display an identifier of the third media content item in a timeslot for the third media content item.

3. The method of claim 1, wherein retrieving the media content guide data for the plurality of channels comprises:
identifying a subset of the plurality of channels preferred by a user; and
retrieving media content guide data for the plurality of channels in the subset.

4. The method of claim 3, wherein identifying the subset of the plurality of channels preferred by the user comprises:
identifying a first group of channels that allow retrieval of the media content distributed by the channels;
retrieving, from a user profile of the user, a viewing history indicating a second group of channels that are viewed regularly by the user; and
identifying a third group of channels that are included in both the first group of channels and the second group of channels,
wherein the subset of the plurality of channels preferred by the user comprises the third group of channels.

5. The method of claim 1, wherein identifying the second media content item that is related to the first media content item comprises:
determining that the first media content item is part of a series of media content items;
identifying an other media content item in the series of media content items that is available for retrieval from the content source for offline viewing; and
selecting the other media content item as the second media content item.

6. The method of claim 1, wherein identifying the second media content item comprises:
retrieving, from a user profile of a user, a media content preference of the user;
identifying a plurality of media content items that are related to the first media content item and are available for retrieval from the content source for offline viewing; and
selecting, from the plurality of media content items, a media content item matching the media content preference of the user.

7. The method of claim 6, wherein the plurality of media content items that are related to the first media content item includes media content items that have at least one of the same genre, plot, director, or starring cast member as the first media content item.

8. The method of claim 6, wherein the media content preference of the user includes at least one of a genre, character, starring cast member, media content series or franchise, director, or other production member.

9. The method of claim 1, further comprising:
retrieving, from a user profile of a user, a media content preference of the user; and
retrieving, from the content source, a plurality of media content items matching the media content preference, wherein generating for display the media content guide interface further comprises:
generating for display a personalized channel with a channel identifier matching the media content preference, and
generating for display identifiers, of the plurality of media content items, in timeslots of the personalized channel.

10. The method of claim 1, wherein generating for display the media content guide interface for the plurality of channels comprises generating for display an indication that the second media content item is provided in place of the first media content item.

11. A system for displaying a guide for media content available on a user device, the system comprising:
control circuitry configured to:
retrieve media content guide data for a plurality of channels, wherein the media content guide data indicates, for each of the plurality of channels, media content items that will be distributed by each respective channel during a plurality of timeslots;
identify, from among the media content items that will be distributed by the plurality of channels, a first media content item that has a respective timeslot of the plurality of timeslots and that is not available for retrieval from a content source for offline viewing in advance of the respective timeslot;
in response to identifying the first media content item, identify a second media content item that is related to the first media content item and is available for retrieval from the content source for offline viewing;
retrieve, from the content source, the second media content item; and
generate for display a media content guide interface that includes identifiers for media content items that are available for offline viewing and excludes identifiers for media content items that are unavailable for offline viewing for the plurality of channels at a time when the user device is not connected to the content source, wherein an identifier of the second media content item which has been retrieved from the content source is displayed in a timeslot for the first media content item.

12. The system of claim 11, wherein the control circuitry is further configured to:
retrieve, from the content source, a third media content item of the media content items that will be distributed by the plurality of channels,
wherein the control circuitry is configured to generate for display the media content guide interface for the plurality of channels further by generating for display an identifier of the third media content item in a timeslot for the third media content item.

13. The system of claim 11, wherein the control circuitry is configured to retrieve the media content guide data for the plurality of channels by:
identifying a subset of the plurality of channels preferred by a user; and
retrieving media content guide data for the plurality of channels in the subset.

14. The system of claim 13, wherein the control circuitry is configured to identify the subset of the plurality of channels preferred by the user by:
identifying a first group of channels that allow retrieval of the media content distributed by the channels;
retrieving, from a user profile of the user, a viewing history indicating a second group of channels that are viewed regularly by the user; and
identifying a third group of channels that are included in both the first group of channels and the second group of channels, wherein the subset of the plurality of channels preferred by the user comprises the third group of channels.

15. The system of claim 11, wherein the control circuitry is configured to identify the second media content item that is related to the first media content item by:
   determining that the first media content item is part of a series of media content items;
   identifying an other media content item in the series of media content items that is available for retrieval from the content source for offline viewing; and
   selecting the other media content item as the second media content item.

16. The system of claim 11, wherein the control circuitry is configured to identify the second media content item by:
   retrieving, from a user profile of a user, a media content preference of the user;
   identifying a plurality of media content items that are related to the first media content item and are available for retrieval from the content source for offline viewing; and
   selecting, from the plurality of media content items, a media content item matching the media content preference of the user.

17. The system of claim 16, wherein the plurality of media content items that are related to the first media content item includes media content items that have the at least one of the same genre, plot, director, or starring cast member as the first media content item.

18. The system of claim 16, wherein the media content preference of the user includes at least one of a genre, character, starring cast member, media content series or franchise, director, or other production member.

19. The system of claim 11, wherein the control circuitry is further configured to:
   retrieve, from a user profile of a user, a media content preference of the user; and
   retrieve, from the content source, a plurality of media content items matching the media content preference,
   wherein the control circuitry is configured to generate for display the media content guide interface further by:
   generating for display a personalized channel with a channel identifier matching the media content preference, and
   generating for display identifiers, of the plurality of media content items, in timeslots of the personalized channel.

20. The system of claim 11, wherein the control circuitry is configured to generate for display the media content guide interface for the plurality of channels by generating for display an indication that the second media content item is provided in place of the first media content item.

* * * * *